(12) United States Patent
Beckers et al.

(10) Patent No.: US 11,358,174 B2
(45) Date of Patent: Jun. 14, 2022

(54) CMUT ARRAY COMPRISING AN ACOUSTIC WINDOW LAYER

(71) Applicant: KONINKLIJKE PHILIPS N.V., Eindhoven (NL)

(72) Inventors: Lucas Johannes Anna Maria Beckers, Eindhoven (NL); Franciscus Johannes Gerardus Hakkens, Eindhoven (NL); Peter Dirksen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 325 days.

(21) Appl. No.: 15/554,454

(22) PCT Filed: Feb. 23, 2016

(86) PCT No.: PCT/EP2016/053799
§ 371 (c)(1),
(2) Date: Aug. 30, 2017

(87) PCT Pub. No.: WO2016/139087
PCT Pub. Date: Sep. 9, 2016

(65) Prior Publication Data
US 2018/0065148 A1 Mar. 8, 2018

(30) Foreign Application Priority Data
Mar. 3, 2015 (EP) .................................... 15157276

(51) Int. Cl.
*H04R 19/00* (2006.01)
*B06B 1/02* (2006.01)
(Continued)

(52) U.S. Cl.
CPC ............ *B06B 1/0292* (2013.01); *G01S 7/521* (2013.01); *G01S 15/02* (2013.01)

(58) Field of Classification Search
None
See application file for complete search history.

(56) References Cited

U.S. PATENT DOCUMENTS 4,813,415 A * 3/1989 Reichenberger ....... G01H 3/005
601/4
4,823,800 A * 4/1989 Compos ................... A61B 8/12
600/454

(Continued)

FOREIGN PATENT DOCUMENTS

JP       S62233149 A    10/1987
JP       2014144155 A    8/2014
KR       100747918 B1 *  8/2007  ........... A61B 8/4455

OTHER PUBLICATIONS

Meier H et al: "Some aspects of a new class of sulfur containing phenolic antioxidants", Polymer Degradation and Stability, Barking, GB, vol. 49, No. 1, Jan. 1, 1995 (Jan. 1, 1995), pp. 1-9.

*Primary Examiner* — Isam A Alsomiri
*Assistant Examiner* — Jonathan D Armstrong

(57) ABSTRACT

An ultrasound array for acoustic wave transmission comprising at least one capacitive micro-machined ultrasound transducer (CMUT) cell (6), wherein the CMUT cell comprises a substrate (4); a first electrode (7); a cell membrane (5) having a second electrode (7'), which opposes the first electrode and the substrate with a cavity (8) there between, wherein the membrane is arranged to vibrate upon the cell activation; and an acoustic window layer (13), overlaying the cell membrane, and having an inner surface opposing the cell membrane and an outer surface. The acoustic window layer comprises a first layer comprising molecules of antioxidant and a polymeric material (47) with insulating particles (41) embedded therein, wherein the polymeric material consists of hydrogen and carbon atoms and has a density equal or below 0.95 g/cm³ and an acoustic impedance equal (Continued)

or above 1.45 MRayl. This acoustic window layer provides an improved acoustic performance, such as wide bandwidth and low attenuation, in application with the CMUT based array.

17 Claims, 6 Drawing Sheets

(51) Int. Cl.
*G01S 7/521* (2006.01)
*G01S 15/02* (2006.01)

(56) References Cited

U.S. PATENT DOCUMENTS

| | | | |
|---|---|---|---|
| 5,050,128 A | 9/1991 | Saitoh et al. | |
| 5,318,035 A * | 6/1994 | Konno | A61B 8/4281 264/240 |
| 5,355,048 A * | 10/1994 | Estes | B06B 1/067 134/134 |
| 5,423,220 A * | 6/1995 | Finsterwald | B06B 1/0622 310/322 |
| 5,756,579 A * | 5/1998 | Fornasari | C08F 279/02 525/316 |
| 6,599,249 B1 * | 7/2003 | Nordgren | A61B 8/4281 600/459 |
| 6,689,066 B1 * | 2/2004 | Omura | A61B 8/12 600/463 |
| 6,831,876 B1 * | 12/2004 | Cartwright | G10K 11/02 181/402 |
| 8,152,729 B2 | 4/2012 | Yamashita et al. | |
| 8,343,289 B2 | 1/2013 | Chaggares et al. | |
| 8,389,627 B2 * | 3/2013 | Rubinsztajn | G10K 11/30 524/408 |
| 9,502,023 B2 | 11/2016 | Wei et al. | |
| 9,733,220 B2 | 8/2017 | Wada et al. | |
| 2002/0006079 A1 * | 1/2002 | Saito | G10K 11/30 367/150 |
| 2003/0060715 A1 * | 3/2003 | Sato | G10K 11/02 600/459 |
| 2006/0241453 A1 * | 10/2006 | Nguyen-Dinh | A61B 8/483 600/445 |
| 2007/0048445 A1 * | 3/2007 | DiMario | B62D 29/043 427/372.2 |
| 2009/0209864 A1 * | 8/2009 | Yamashita | A61B 8/4281 600/459 |
| 2009/0301200 A1 * | 12/2009 | Tanaka | B06B 1/0292 73/603 |
| 2011/0310053 A1 * | 12/2011 | Kim | C08K 5/41 345/174 |
| 2013/0301394 A1 * | 11/2013 | Chen | B06B 1/0292 367/155 |
| 2013/0323482 A1 * | 12/2013 | Poon | H01B 1/22 428/212 |
| 2014/0160370 A1 * | 6/2014 | Lee | H05K 3/064 349/12 |
| 2014/0249419 A1 * | 9/2014 | Morita | G10K 11/02 600/459 |
| 2014/0257145 A1 * | 9/2014 | Emery | A61N 7/02 601/2 |
| 2014/0265728 A1 | 9/2014 | Li et al. | |
| 2014/0338455 A1 | 11/2014 | Wada et al. | |
| 2015/0173625 A1 * | 6/2015 | Chaggares | A61B 5/0095 600/407 |
| 2015/0321026 A1 * | 11/2015 | Branson | A61N 7/00 601/2 |
| 2017/0028227 A1 * | 2/2017 | Emery | A61N 7/02 |
| 2017/0228573 A1 * | 8/2017 | Shen | G06K 9/0002 |
| 2019/0142380 A1 * | 5/2019 | Emery | A61B 8/54 600/439 |
| 2021/0038925 A1 * | 2/2021 | Emery | A61N 7/02 |
| 2021/0093898 A1 * | 4/2021 | Pooth | A61N 7/02 |

* cited by examiner

CMUT ARRAY COMPRISING AN ACOUSTIC WINDOW LAYER

This application is the U.S. National Phase application under 35 U.S.C. § 371 of International Application No. PCT/EP2016/053799, filed on Feb. 23, 2016, which claims the benefit of EP Application Serial No. 15157276.5, filed Mar. 3, 2015. These applications are hereby incorporated by reference herein.

FIELD OF THE INVENTION

The invention relates to an ultrasound array for acoustic wave transmission comprising at least one capacitive micromachined ultrasound transducer (CMUT) cell, wherein the CMUT cell comprises a substrate having a first electrode; a cell membrane having a second electrode, which opposes the first electrode with a cavity there between, wherein the membrane is arranged to vibrate upon the cell activation; and an acoustic window layer, overlaying the cell membrane, and having an inner surface opposing the cell membrane and an outer surface.

The invention further relates to a manufacturing method of such an array; and an ultrasonic imaging system comprising such an ultrasound array.

BACKGROUND OF THE INVENTION

Central to any ultrasound (imaging) array is the ultrasound transducer which converts electrical energy in acoustic energy and back. Recent progress in semiconductor technology resulted in the development of capacitive micromachined ultrasound transducers (CMUT). These transducers are considered to be potential candidates to replace the conventional piezoelectric based ultrasound transducers (PZT). A CMUT transducer cell comprises a cavity with a movable mechanical part also called a membrane and a pair of electrodes separated by the cavity. When receiving ultrasound waves, ultrasound waves cause the membrane to move or vibrate and change the capacitance between the electrodes which can be detected. Thereby the ultrasound waves are transformed into a corresponding electrical signal. Conversely, an electrical signal applied to the electrodes causes the membrane to move or vibrate, thereby transmitting ultrasound waves.

Advantages of CMUTs are that they can be made using semiconductor fabrication processes and, therefore, may be easier integrated with application-specific integrated circuitry (ASIC); CMUT transducers offer low cost, extended frequency range and finer acoustic pitch over traditional PZTs.

Inherently from the PZT based technology most of the commonly used ultrasound arrays with CMUTs have acoustic windows or lens materials selected from the materials used for the PZT-based transducers, such as silicon rubbers, for example RTV.

However, the CMUT possesses different to the PZT mechanism of an electro-acoustical transformation, wherein an interactions between the CMUT membranes and the acoustic materials used for acoustic window or lens may reduce the acoustic performance of the transducer.

US 2013/0301394 A1 suggests using a coupling medium between the CMUT and the acoustic window. The presented examples of the medium materials contain either solid-based materials, such as plastics, rubber, room temperature vulcanizing silicon (RTV), dry film photoresists; or liquid-based materials, such as oils, gels. A drawback of this coupling medium that the suggested list of the coupling medium materials contains different materials having a broad range of acoustic properties often showing a strong attenuation for the propagating acoustic wave. A selection of the specific medium material would further require its adjustment to an acoustic window layer applied to the ultrasound array.

There is a need in providing an improved acoustic window layer suitable for the CMUT-based ultrasound array for acoustic wave transmission.

SUMMARY OF THE INVENTION

It is an object of the present invention to provide an ultrasound array comprising at least one capacitive micromachined ultrasound transducer cell of the kind set forth in the opening paragraph which provides improved acoustic wave propagation.

This object is achieved according to the invention by providing an acoustic window layer that comprises a first layer comprising molecules of antioxidant and a polymeric material with particles embedded therein, wherein the polymeric material polymeric material contains hydrogen and carbon atoms and has a density equal or below 0.95 g/cm$^3$ and an acoustic impedance equal or above 1.45 MRayl.

It was discovered that traditional filled silicon rubbers obtained by vulcanization (also referred here as room temperature curing rubber or RTV) acoustic lens materials, which are easily cast in place and formed by molding into a desired shape, brought in contact with the CMUT array introduce an additional acoustic losses in the CMUT array in addition to normal frequency dependent attenuation. This loss is manifested in increased attenuation on the order of 2 dB and a downshift in center frequency of up to 4 MHz. It was discovered that the polymeric material containing only hydrogen and carbon atoms, may exhibit an acoustic loss per millimeter for acoustic energy passing therethrough of less than 1.5 dB for a wide range of the acoustic wave frequencies applicable in medical ultrasound, such as in between 2 and 25 MHz. A distinguishing feature of the present invention is that the first layer additionally comprises molecules of antioxidant, which prevents the polymeric layer to further cross link (oxidize) with time. Thus, the antioxidant keeps properties of the polymeric material, such as hardness value, constant in time. The introduction of the particles embedded into this polymeric material provides a possibility of increasing a total impedance of the acoustic layer bringing it closer to an ultrasonicated tissue impedance value of about 1.6 MRayl. Due to the fact that the polymeric layer exhibits such a low acoustic energy loss (attenuation), possible additional acoustic losses caused by the embedded particles may be sufficiently low in order to influence a quality of the acoustic wave propagation through the acoustic window layer. When the polymeric material containing carbon and hydrogen atoms only and has a density equal or below 0.95 g/cm$^3$ and an acoustic impedance equal or above 1.45 MRayl a direct acoustical coupling of the acoustic window layer to the membrane of the CMUT cell is provided. Thus, no additional coupling medium between the acoustic window and the CMUT array is required. Moreover, the acoustic impedance equal or above 1.4 MRayl requires relatively smaller amount of the particles in order to bring the impedance of the first layer closer to the impedance of the ultrasonicated tissue (1.6 MRayls).

In an embodiment of the present invention the polymeric material comprises an thermoset elastomer.

The thermoset elastomer, also known as thermoset rubber, containing only hydrogen and carbon atoms have a relatively low density and in an uncured state have a hardness value below 50 Shore A (typical to the elastomers). These properties combined with the low acoustic wave attenuation may provide a beneficial effect on the improved acoustic coupling of the CMUT vibrating membranes with the acoustic window layer. In addition, the elastomer's acoustic impedance values are closer to the tissue's impedance, which may lead to on average a smaller amount of the introduced particles required for the acoustic impedance adjustment.

In yet another embodiment of the present invention the thermoset elastomer is polybutadiene.

Polybutadiene belongs to the thermoset elastomers containing no other atom types than hydrogen and carbon (hydrocarbons). This material shows one of the lowest attenuation effects on the propagating acoustic energy. Additionally polybutadiene material provides a large band width of about 140% at 3 dB-point for the propagating acoustic signal. The antioxidant molecules keep the hardness of the first layer comprising polybutadiene around 5 Shore, well below 50 Shore. The addition of the insulating particles to the polybutadiene material does not considerably change the material's hardness. Therefore, the acoustical coupling of the acoustic window layer, comprising the polybutadiene with embedded particles, to the membrane of the CMUT provides an optimal preservation of mechanical properties of the vibrating (moving) part and results in the optimal acoustic energy propagation.

In a further embodiment of the present invention the thermoset rubber is a copolymer, such as butyl rubber.

Copolymers comprising two monomers provide a further possibility for the acoustic layer's attenuation and hardness adjustment via inheriting some of the beneficial acoustic properties from one of the monomers, such as isoprene. In particular, butyl rubber is an isobutylene-isoprene copolymer and shows hardness as low as 40 ShoreA.

In another embodiment the molecules of antioxidant are phenolic stabilizers, wherein each molecule of the phenolic stabilizer has a hydrocarbon chain coupled to a hindered phenol group.

The hydrocarbon chain of the molecule of phenolic stabilizer improves mixing of the antioxidant with the polymeric material, such as polybutadiene, while a hindered phenol group forming a head of the molecule acts as a hydrogen donor thereby buffering oxygen from outside.

In a further embodiment, a weight ratio of the molecules of antioxidant in the first layer is at most 0.3%, preferably 0.1%.

These concentration ranges keep acoustic properties of the polymeric layer unchanged, while efficiently preventing the layer from its oxidation caused by exposure to the atmosphere.

In yet another embodiment of the present invention the first layer comprises 4 to 24 percent, preferably 15 or 20 percent, by weight of the particles based on a total weight of the first layer.

Due to the fact that the polymeric layer has a relatively low density and relatively high acoustic impedance, compared to silicon rubbers for example, a smaller percentage by weight of the particles (embedded in the polymeric layer) based on the total weight of the first layer may need to be added for the further acoustic impedance adjustment.

In another embodiment of the present invention the particles have an average size smaller than one tens of an acoustic wavelength propagating through the acoustic window layer.

The average size of the particles is preferably lower than one tens of the acoustic wavelength of the shortest wave within an operation bandwidth for the selected ultrasound application. When the average size of the particles becomes larger than the wavelength of the propagating wave, an additional scattering in the acoustic window layer may happen.

In another embodiment of the present invention the particles have an average size in between 10 nanometer and 10 micrometer, in particular in between 10 nanometer and 100 nanometer or in between 1 micrometer and 10 micrometer.

These ranges of the average particles cover main application of the ultrasound imaging systems at different frequencies. For example, for acoustic wave velocity of 1500 m/s one tens of the acoustic wavelength is: 150 micrometer for frequency of 1 MHz; 15 micrometer for frequency of 10 MHz and 5 micrometer for frequency of 30 MHz.

In an embodiment of the present invention the particles are ceramic particles.

Ceramic particles can be highly insulating and chemically stable. Moreover, they can be manufactured using known techniques with more defined size distributions.

In a further embodiment of the present invention the ultrasound array has a fractional bandwidth above 80%, preferably above 100%.

The ultrasound array overlaid by the first layer of the acoustic window layer, wherein the first layer is in a direct contact with the cell membrane and comprises antioxidant molecules and a polymeric material, preferably thermoset elastomer, containing hydrogen and carbon atoms, is provided with optimal conditions (stable over time) for the acoustic wave propagation, wherein the polymeric layer has a density equal or below 0.95 g/cm$^3$ and an acoustic impedance equal or above 1.4 MRayl. Thus, the ultrasound array of the present invention has an ultra-wide bandwidth due to the improved acoustic properties of the acoustic window layer of the present invention, compared to the conventional acoustic layers. This provides an additional advantage to the ultrasound CMUT array, capable of operating at variable ultrasound frequencies, such as in between 2 MHz to 30 MHz.

In an embodiment of the present invention the acoustic window layer further comprises a second layer facing the outer surface and having a larger hardness than the first layer.

The additional second layer comprising a relatively harder layer, such as polymethylpentene, for example, provides an improved chemical stability to the acoustic window layer against the influence of environment.

Yet, in another embodiment of the present invention the acoustic impedance difference between the first layer and the second layer is smaller than 0.3 MRayl.

This condition minimizes an acoustic impedance mismatch between the first and second layers, such that the propagating through the acoustic window layer acoustic wave does not experience a considerable backscattering at the boundary of the two layers.

Yet, in another embodiment of the present invention a method for manufacturing an ultrasound array comprising: dissolving a polymeric material in a solvent; adding antioxidant and particles to the solvent, wherein the polymeric material act as a dispersion agent for the particles, such that a liquid mixture of the polymeric material and the particles is provided; providing a chip having at least one CMUT cell coupled to an integrated circuitry; dipping the chip in the liquid mixture or dispensing the liquid mixture on the chip, such that a layer comprising the liquid mixture overlays the CMUT cell; curing the layer at a temperature sufficient to evaporate the solvent from the liquid mixture, such that an acoustic window layer comprising a polymeric material with particles embedded therein is provided overlaying the CMUT cell.

This novel method can be scaled up to an industrial production of the acoustic window layers based on polymeric material with embedded particles. Moreover, it permits creating a homogenous layer of the acoustic window material on a chip with a CMUT cell coupled to an integrated circuitry by the dipping technique. The dipping or dispensing techniques can be beneficially used for different chip sizes comprising different ways of the CMUT bonding to the integrated circuitry, such as wire bonding, wherein the commonly used acoustic window materials coated with the commonly used manufacturing methods fail in providing a homogenous acoustic layer having a tissue matching acoustic impedance and minimized acoustic losses.

In another embodiment of the method the polymeric material is polybutadiene.

The low attenuation characteristics of the butadiene combined with the increased acoustic impedance due to the particles, preferably insulating, embedded therein lowers the strict requirements to the acoustic window layer thickness throughout the array. This provides a fast and easy method for the ultrasound array manufacturing.

These and other aspects of the invention will be apparent from and elucidated with reference to the embodiments described hereinafter.

DETAILED DESCRIPTION OF EMBODIMENTS

Figure 1:
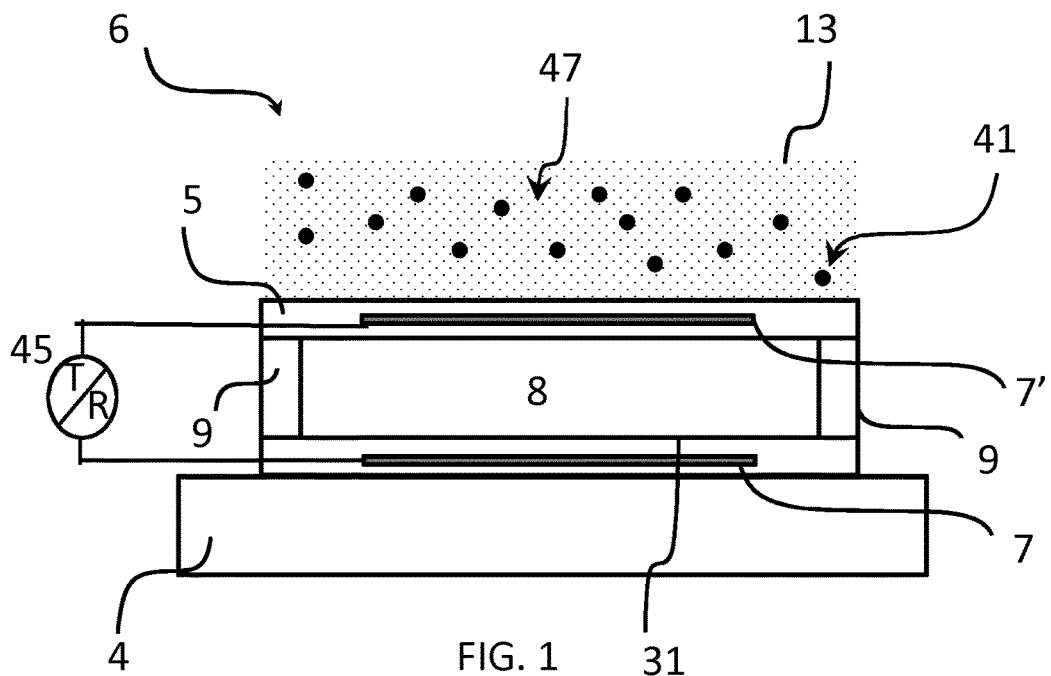
FIG. 1 shows schematically and exemplarily a side view of a CMUT cell of an ultrasound array comprising an acoustic window layer having a first layer comprising antioxidant and a polymeric material with particles embedded therein.

FIG. 1 shows schematically and exemplarily a CMUT cell in cross section according to the present invention. Such CMUT cell is typically fabricated on a substrate 4, such as a silicon wafer. An ultrasound array of an ultrasound system may comprise one or more CMUT cells 6. The CMUT cells may be either individually activated or in combination with each other. The individual cells can have round, rectangular, hexagon or other peripheral shapes.

Each CMUT cell has at least a pair of electrodes 7' and 7 separated by a cavity 8. The cavity 8 is formed in between a membrane 5 that is suspended over a cell floor 31 formed by the top surface of the substrate 4. The membrane 5 may be made of silicon nitride and is adapted to move or vibrate. It can be suspended over the cell floor 31 (or substrate) through a plurality of supporting portions 9 (in FIG. 1 two supporting portions 9 are shown). The electrodes 7, 7' are made of electrically conductive material, such as metal. The bottom electrodes 7 may be embedded in the floor of the cell 31, while the top electrode 7' may be embedded in the membrane 5. The electrode 7 and 7' may be also deposited on the cell floor 31 or the membrane 5 as additional layers. The bottom electrode 7 is typically insulated on its cavity-facing surface with an additional layer (not pictured). This insulating layer can comprise either one of or a combination of an oxide-nitride-oxide (ONO) dielectric layer, silicon oxide layer, aluminum or hafnium oxide layers. The insulating layer may be formed above the bottom electrode 7 and below the membrane electrode 7'. The ONO-dielectric layer advantageously reduces charge accumulation on the electrodes which leads to device instability, drift and reduction in acoustic output pressure. The supporting portions 9 may be made of an insulating material such as silicon oxide or silicon nitride. The cavity 8 can be either air- or gas-filled, or wholly or partially evacuated. Two electrodes 7 and 7' separated by the cavity 8 represent a capacitance. An application of electrical signal through a drive circuit 45 coupled to the electrodes 7 and 7' causes a mechanical movement/vibration of the membrane 5, which results in the change of the capacitance and can be manipulated by an associated with the CMUT transducer integrated circuitry. The drive circuit 45 can be implemented as an integrated part of the integrated circuitry. The drive circuit 45 usually comprises an a.c. signal and a d.c. voltage sources and associated to these sources circuitry.

According to the principles of the present invention, the membrane 5 of the CMUT cell is acoustically coupled to an acoustic window layer 13 overlaying the cell membrane, and having an inner surface opposing the cell membrane and an outer surface located in the opposite direction of the inner surface. The outer surface may be either a patient or an object facing side, which can be the subjects of the ultrasound examination. The acoustic window layer comprises antioxidant and a first layer comprising a polymeric material 47 with particles 41 embedded therein. In accordance with the present invention the polymeric material contains hydrogen and carbon atoms and has a density equal or below 0.95 g/cm$^3$ and an acoustic impedance equal or above 1.4 MRayl. In particular, suitable materials may be selected from thermoset rubbers (elastomers).

Due to the limited content of the polymeric material to hydrogen and carbon atoms, the density of the material is relatively low compared to other polymeric materials, in particular rubbers.

Elastomers are generally characterized by wide-meshed crosslinking of the "knotted" molecular chains. This type of crosslinking means that the materials have a high level of dimensional stability but are still elastically malleable. By applying load (for instance tensile load) the chains become stretched, but after removal of the load they relax again. A typical hardness of the uncured elastomers is below 50 ShoreA, measured by a durometer (A scale). In general, cured (baked) elastomers exhibit higher hardness than 50 ShoreA. In order to keep the hardness below 50 ShoreA the elastomer comprising layer can under-cured (the solvent is not entirely evaporated as described in step); in addition in order to keep the elastomer from oxidizing over time under exposure to oxygen from the atmosphere the antioxidant molecules are added to the first layer as well. Elastomers can be also thermoset, the individual molecular chains of the thermosets are characterized by three-dimensional closely meshed irreversible crosslinking Thermoset elastomers are chemically and mechanically more stable among elastomers, moreover in contrast to not meltable "pure" elastomers, thermoset elastomers may be processed similar to thermoplastics.

Suitable thermoset elastomers containing hydrogen and carbon atoms and having density equal or below 0.95 g/cm$^3$ (in particular in between 0.85 and 0.95 g/cm$^3$) are listed in Table 1. The chemical formula represents monomers used for the polymer chains formation. For example, the initial polymer chains of the polybutadiene and bytul rubbers comprise olefins (also referred as alkenes). During the cross-linking process of the thermoset manufacturing many double carbon-carbon bonds of the polymeric chains are broken to form a network of intrechain bonds (cross-links).

rubber has a hardness below 50 ShoreA, while butyl rubber, which polymeric chains consist of two monomers: isobutylene and isoprene, may show hardness values as low as 40 ShoreA. In order to reduce the hardness even lower, fatty acids can be added into a liquid mixture of the elastomer material. This will be discussed below in detail.

Figure 6:
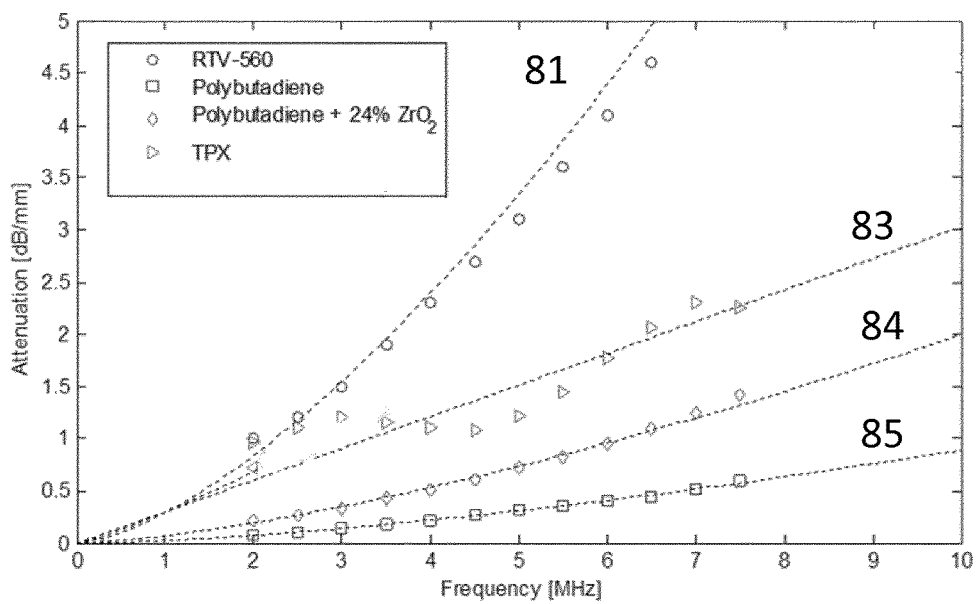
FIG. 6 is a graph comparing an acoustic frequency dependence of an acoustic loss (in dB) per millimeter for acoustic energy passing therethrough for different acoustic window materials.

Polymeric materials having properties in accordance with the present invention showed to have a considerably lower attenuation (acoustic energy loss measured in dB per millimeter) for an acoustic wave having its frequency in range from 1 to 20 MHz. FIG. 6 shows an acoustic frequency dependence of attenuation of the acoustic energy passing therethrough for different acoustic window materials. Symbols indicate measured data and lines indicate simulated dependencies. The presented materials show a steady increase of the attenuation value with the increase in frequency. The highest attenuation, which increases considerably with the frequency, is observed for the commonly used filled silicon rubber (RTV-560, curve 81): the attenuation reaches almost 5 dB/mm at a frequency around 7 MHz. The smallest attenuation is observed for polybutadiene (curve 85), which shows attenuation below 0.5 dB/mm at frequencies below 5 MHz and 1 dB/mm at frequencies below 10 MHz. As will be described further, even an introduction of the insulating particles embedded into the polybutadiene material does not considerably increase the attenuation of the layer. Curve 84 shows that the attenuation of the polybutadiene layer having 20% of its total weight embedded with $ZrO_2$ particles remains below 1 dB/mm at frequencies below 5 MHz and 2 dB/mm at frequencies below 10 MHz. For comparison, the polymethylpentene material (Mitsui trade name TPX, curve 83) shows attenuation somewhat in between the polybutadiene and RTV varying from about 0.5 dB/mm at 2 MHz up to 3 dB/mm at 10 MHz. It has been shown that in order to keep acoustic properties of the first

TABLE 1

Examples of the thermoset elastomers containing hydrogen and carbon atoms and having a density equal or below 0.95 g/cm$^3$ at temperature of 25 degrees centigrade.

| Thermoset elastomer | Chemical formula | Density (g/cm$^3$) at 25° C. |
|---|---|---|
| Polybutadiene | $-[CH_2-CH=CH-CH_2]_n-$ | 0.9-0.95 |
| Butyl (isobutylene-isoprene copolymer) | $-[CH_2-C(CH_3)_2]_x- -[CH_2-CH=CH-CH_2]_y-$ | about 0.92 |
| Ethylene propylene (EPM/EPDM) | $-[CH_2-CH_2]_x-[CH_2-CH(CH_3)]_y-[+\text{diene monomer in EPDM}]_z$ | 0.85-0.87 |
| Isoprene (synthetic cis-polyisoprene) | $-[CH_2-CH=C(CH_3)-CH_2]_n-$ | 0.91-0.92 |
| Natural | $-[CH_2-CH=C(CH_3)-CH_2]_n-$ | 0.91-0.93 |

Depending on the application a thermoset elastomer with different hardness can be selected. Uncured polybutadiene layer constant (prevent it from further hardening) antioxidant molecules are added to the first layer. A weight ratio of the molecules of antioxidant in the first layer is preferably at most 0.3% or better around 0.1%.

In accordance with the principles of the present invention the reported improvement in the acoustic wave transmission (lower attenuation) through the acoustic window layer 13 comprising the polymeric material 47, such as polybutadiene, can be attributed to the different mechanism of the electro-acoustical transformation in the CMUT compared to the PZT. The PZT-based transducer typically has a parallelepiped shape, wherein at least one of its faces is adapted to vibrate in a piston-like motion during the transmission of the acoustic wave. The displacement of the vibrating (active) face is homogeneous throughout the face surface.

Figure 10:
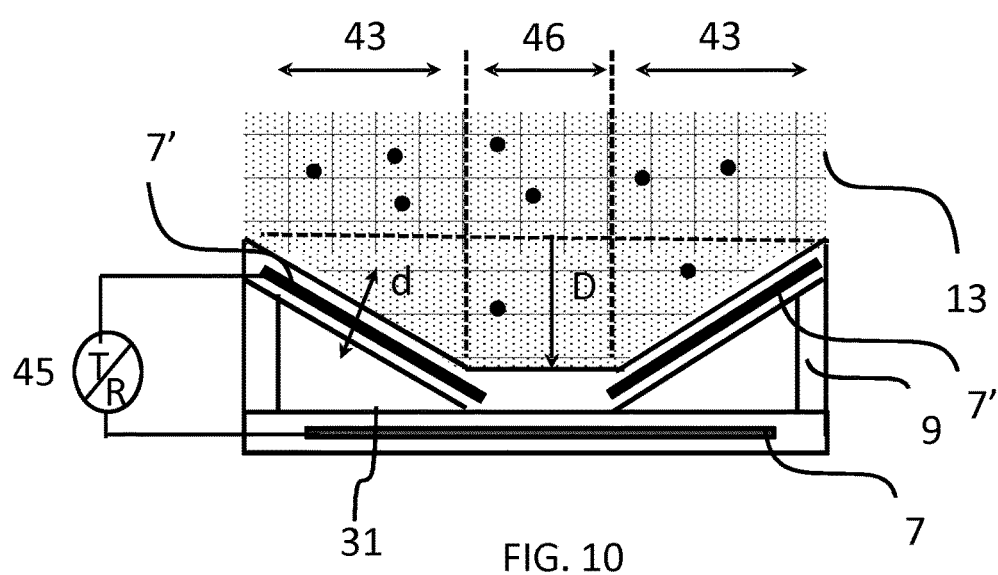
FIG. 10 shows schematically and exemplarily a side view of a CMUT cell operating in the collapsed mode and being acoustically coupled to the acoustic window layer.

In contrast, the CMUT's vibrating membrane has a different displacement throughout the membrane's area (surface). In a conventional operation mode the membrane's displacement is highest in the central part of the CMUT cell and lowest at the periphery of the membrane. In a collapsed mode of operation as shown in FIG. 10 the membrane 5 of the CMUT cell 6 is partially contacting the cell floor 31, which results in the biggest membrane displacement (D) compared to the conventional operation mode. During the CMUT operation a central part of the membrane 46 may be brought into the contact with (collapsed to) the cell floor 31 by applying a collapsed d.c. voltage value (the d.c. voltage is supplied by the drive circuitry 45). The applied a.c. signal voltage supplied by the drive circuitry 45 causes the suspended portions of the membrane 43 (located at a periphery of the membrane) to move/vibrate with an amplitude d under applied electrical signal in between electrodes 7 and 7'. From technology point of view, the CMUT with the collapsed membrane can in principle be manufactured in any conventional way, comprising providing a CMUT with a membrane and applying different means, such as electrical (bias voltage) or pressure, in order to bring the membrane to a collapsed state. In the collapsed operation mode, the displacement D of the central part of the membrane is fixed, while the suspended portions of the membrane vibrate with an amplitude d, which is determined by the applied a.c. voltage signal.

The variation in the displacement of the membrane's vibrating portions imposes different requirements on the acoustic window layer properties in order to provide an improved acoustic coupling of the operating CMUT transducer. The acoustic window layer may need to adopt its inner surface to the membrane's displacement. The relatively light molecular weight of the monomers of the polymeric material 47, preferably thermoset elastomer, combined with the material's relatively low hardness (below 60 ShoreA, preferably below 50 ShoreA) may provide an improved acoustic contact between the acoustic window layer 13 and the CMUT's membrane adapted to vibrate. In addition the low acoustic wave attenuation of this polymeric material may provide an improved transition of the wave throughout the acoustic layer 13.

It has been found that in the absence of antioxidant molecules acoustic layer comprising polybutadiene increases hardness of the polymeric material caused by aging due to its oxidation. When the hardness of the acoustic layer being in contact with the CMUT array increases above 60 Shore the layers acoustic transmission properties (for the CMUT array) are substantially reduced. It is undesirable to have an acoustic material having its properties changing with time, further it is even more undesirable to end up with an acoustic window layer having unsuitable acoustic wave transmission.

In accordance to the present invention antioxidant molecules are added to the polybutadiene layer. For example, molecules of phenolic stabilizer can be used. Phenolic stabilizers are primary antioxidants that act as hydrogen donors in the polymeric layer. They react with peroxy radicals to form hydroperoxides and prevent the abstraction of hydrogen from the polymer backbone.

In the present embodiment, sterically hindered phenol was used with uncured polybutadiene layer. The molecule of this antioxidant (BASF trade name Irganox 1076) has a hydrocarbon chain (or tail) coupled to a hindered phenol group (head).

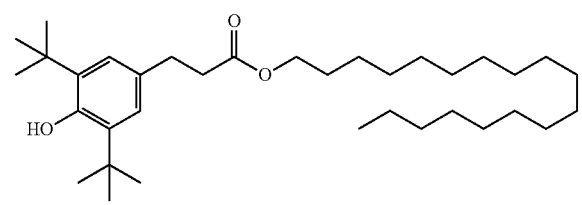

Phenolic Primary Antioxidant: Irganox 1076

The hydrocarbon chain of the molecule of phenolic stabilizer improves mixing of the antioxidant with the polymeric material, such as polybutadiene, while a hindered phenol group forming a head of the molecule acts as a hydrogen donor thereby buffering oxygen from outside.

Figure 2:
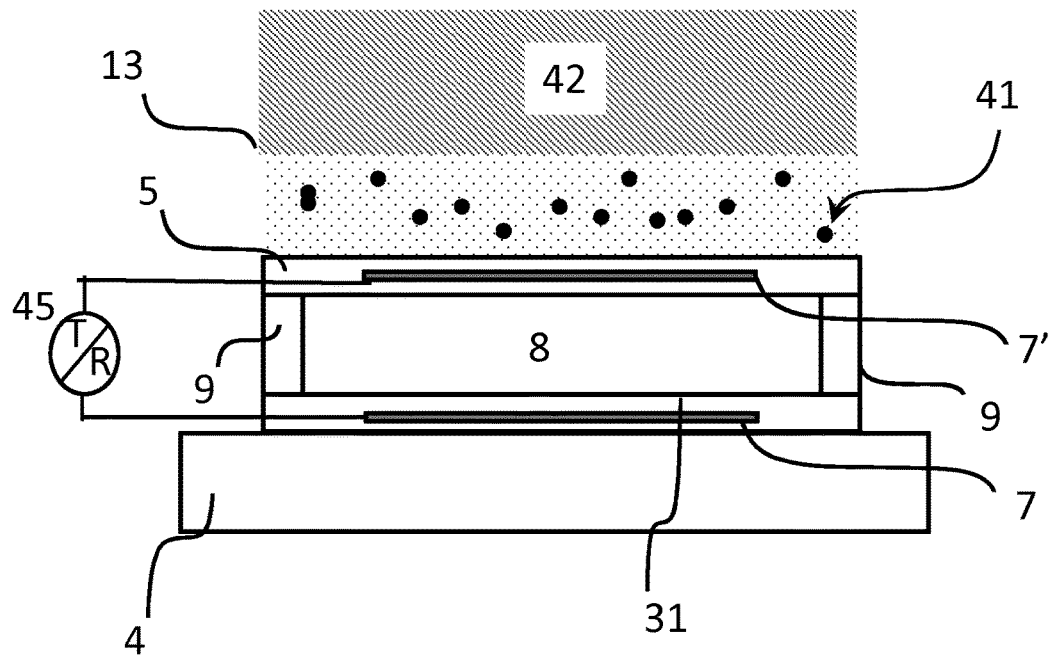
FIG. 2 shows schematically and exemplarily a side view of a CMUT cell of an ultrasound array comprising an acoustic window layer having the first layer and a second layer facing the outer surface side and comprising a durable layer.

Another embodiment of the present invention is illustrated in FIG. 2. The acoustic window layer 13 may further have a second layer comprising a durable exterior layer 42, which is located at the outer surface side. The durable exterior layer located as the outer surface may satisfy different mechanical and/or chemical characteristics of the acoustic window layer 13. For example, depending on the purpose of the ultrasound transducer, the following material may be used in the second layer: materials having a different abrasion resistance to the polymeric material 47, material with different friction coefficients. In order to improve the chemical stability of the acoustic window the second layer may have a layer of thermoplastic polymer, such as polymethylpentene; and in order to provide moisture barrier layers of mylar, polyethylene and/or parylene may be introduced into the second layer.

In order to vary a total hardness of the acoustic window layer 13, an additional layer a polyolefin thermoplastic elastomer may be selected. For example, copolymers having monomers of ethylene and alpha olefins, such as octane or butane. Thermoplastic elastomers (TPE), sometimes referred to as thermoplastic rubbers, are a class of copolymers or a physical mix of polymers (usually a plastic and a rubber) which consist of materials with both thermoplastic and elastomeric properties.

It shall be understood by a person skilled in the art that additional layers providing the acoustic window layer with improved biocompatibility or elasticity properties may be introduced into the acoustic window 13.

Figure 3:
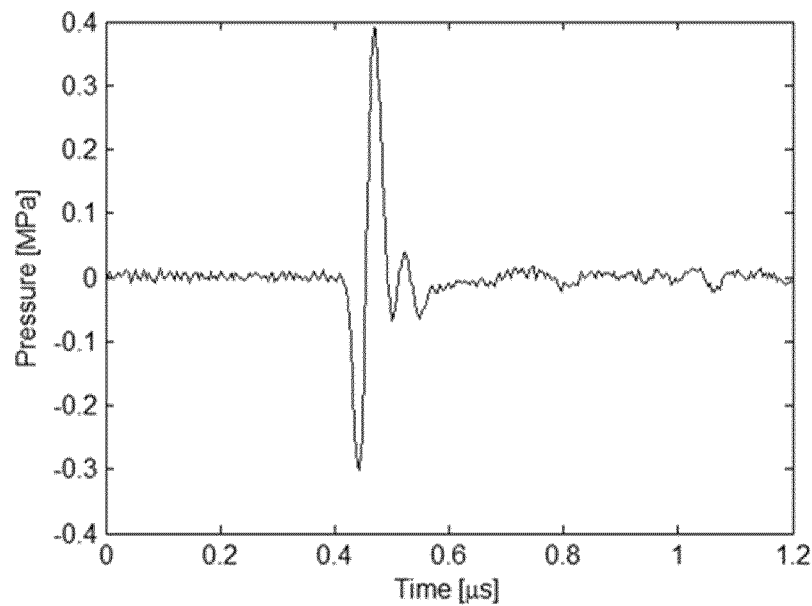
FIG. 3 is a graph showing a reference acoustic signal.
Figure 4:
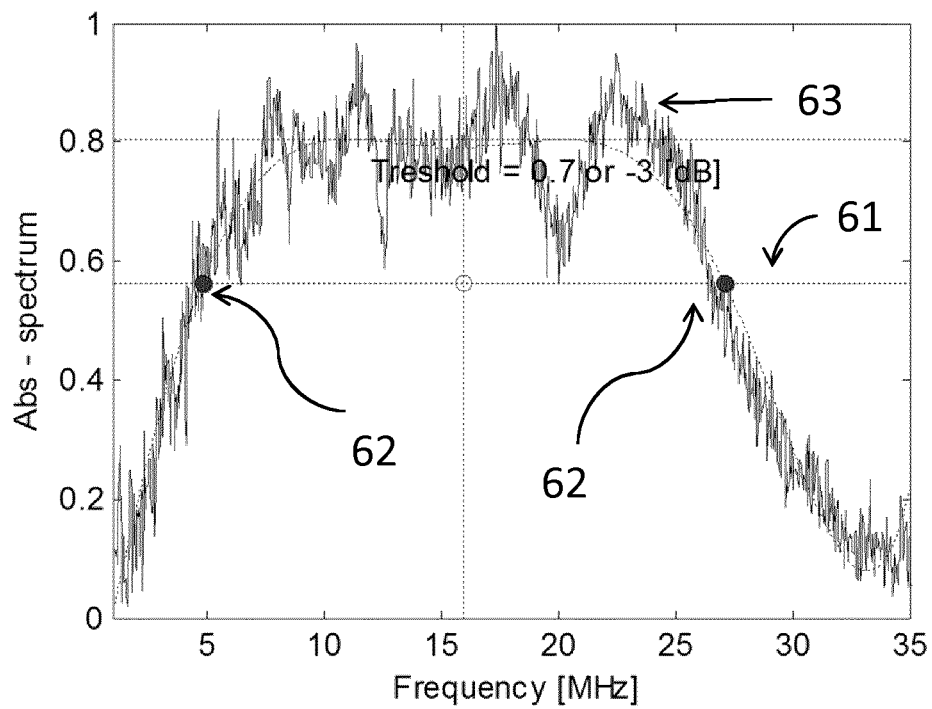
FIG. 4 shows a normalized output pressure of the ultrasound array comprising at least one CMUT cell and an acoustic window layer having a first layer comprising a polybutadiene.

FIG. 3 illustrates a reference acoustic signal transmitted by the CMUT cells of the array through the acoustic window layer. FIG. 4 illustrates a normalized output pressure 63 of the array overlaid by 30 micrometer thick polybutadiene layer capped with the second layer of 5 micrometer thick parylene. As can be seen in FIG. 4 the polybutadiene layer provides superior acoustic properties to the acoustic window, namely ultra-wide bandwidth. Intersection points 62 of a horizontal line 61 with the output pressure curve 63 of the array give a lower cut-off frequency ($f_1$) of about 5 MHz and an upper cut-off frequency ($f_2$) of about 27 MHz at the signal's attenuation of 3 dB. Thus, the bandwidth of the array is about 140%. Note, that the reference is made to a fractional bandwidth (FBW %) calculated as percentage value of $$FBW=2\cdot(f_2-f_1)/(f_2+f_1).$$

A relative sensitivity of this array is about 4 MPa per 100 V of an applied a.c. signal. The relative sensitivity is determined in the following way, for each given a.c. signal applied to the CMUT electrodes 7,7' (for instance 20V) an output pressure is measured and then normalized to the output pressure achieved at 100V.

Figure 5:
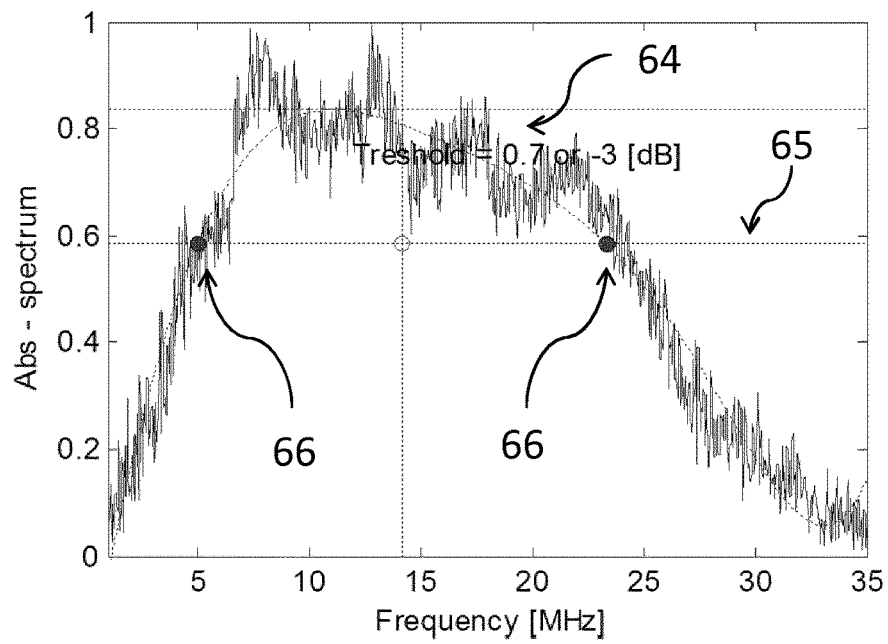
FIG. 5 shows a normalized output pressure of the ultrasound array comprising at least one CMUT cell and an acoustic window layer having a first layer comprising a polybutadiene and the second layer comprising polymethylpentene.

FIG. 5 illustrates a normalized output pressure 64 of the array overlaid by 60 micrometer thick polybutadiene layer capped with the second layer of TPX material, wherein the TPX layer is 0.2 millimeter thick and is glued to the first layer of polybutadiene with a third layer of polyurethane. Intersection points 66 of a horizontal line 65 with the output pressure curve 64 of the array give a lower cut-off frequency ($f_1$) of about 5 MHz and an upper cut-off frequency ($f_2$) of about 23 MHz at the signal attenuation of 3 dB. Thus, the bandwidth of the array is about 130%. Even the introduction of the durable material layer that is thicker than the first layer of polybutadiene interfacing with the CMUT membrane does not considerably reduce the ultrawide band-width of the array. The sensitivity of the array in this embodiment is about 3 MPa per 100 V. An additional advantage of the TPX material is its chemical stability, especially towards commonly used cleaning agents in medical applications, and mechanical resistance.

The polymeric layer, especially thermoset elastomers, which contain hydrogen and carbon atoms and have density equal or below 0.95 g/cm$^3$ may exhibit a low acoustic energy loss (attenuation) and a suitable acoustic impedance optimization.

Acoustic impedance (Z) is defined as the product of acoustic propagation velocity (v) for acoustic energy (or wave) in a medium and density ($\rho$) of this medium:

$$Z=\rho*v.$$

These polymeric materials may have an acoustic impedance value of above 1.4 MRayl, which is closer to a soft tissue's impedance of about 1.6 MRayl. In order to minimize an impedance mismatch between the ultrasound array and the ultrasonicated tissue it may be desirable to further increase the acoustic impedance value of the acoustic window material comprising the polymeric layer. This can be achieved by adding a filler, such as particles 41 (preferably insulating), into the polymeric layer 47. The introduction of the particles into the polymeric layer increases a total density of the first layer. It has been discovered that the additional acoustic losses caused by the embedded insulating particles are sufficiently low and do not considerably influence a quality of the acoustic wave propagation through the polymeric layer.

As an example, Table 2 shows the measured changes in acoustic properties of the polybutadiene layer with the introduction of zirconium dioxide (ZrO$_2$) insulating particles having in average diameter of about 2.5 micrometer and taking a fixed percentage of a total weight of the first layer.

TABLE 2

Changes in the density, acoustic wave velocity, acoustic impedance and attenuation (at frequency of 7 MHz) with an increasing percentage by weight of ZrO$_2$ particles based on the total weight of the polybutadiene layer.

| % ZrO2 | Density (g/cm$^3$) | Velocity (mm/microsec) | Impedance (MRayl) | Attenuation @7 MHz (dB/mm) |
|---|---|---|---|---|
| 0 | 0.906 | 1.570 | 1.423 | 0.55 |
| 4% | 0.937 | 1.553 | 1.455 | 0.75 |
| 8% | 0.972 | 1.532 | 1.489 | 0.87 |
| 16% | 1.0405 | 1.503 | 1.564 | 1.05 |
| 20% | 1.0855 | 1.469 | 1.5945 | 1.25 |

As can be seen from the table with the total density increase of the first layer comprising polybutadiene, the acoustic impedance of the layer can be tuned towards higher values, e.g. closer to the tissue's acoustic impedance, while the attenuation of the layer still remains below 1.5 dB/mm, even for the layers comprising 20% of its weight taken by the insulating particles (ZrO$_2$). When the first layer of the acoustic window layer, comprising the antioxidant molecules and the polymeric material with embedded insulating particles, has a density equal or above 0.94 g/cm$^3$ and an acoustic impedance equal or above 1.5 MRayl a direct acoustical coupling of the acoustic window layer to the membrane of the CMUT cell is provided. Thus, no additional coupling medium between the acoustic window and the CMUT array is required. Moreover, the acoustic impedance equal or above 1.5 MRayl matches closer to the impedance of the ultrasonicated tissue.

The additional advantage of the polymeric materials containing hydrogen and carbon atoms and having a density equal or below 0.95 g/cm$^3$ and an acoustic impedance equal or above 1.45 MRayl, preferably 1.5 MRayl, is that compared to commonly used silicon based rubbers (with a typical acoustic impedance value of round 1.1-1.2 MRayl) in ultrasound, these polymeric materials, in particular polybutadiene, possess higher acoustic impedance. Therefore, in order to tune the acoustic impedance of the polymeric layer 47 to a tissue's impedance a relatively smaller amount of the filler may be used, compared to the filled silicones. Since an introduction of the insulating particles to a layer on average increases its hardness, an application of the these polymeric materials having higher acoustic impedance provides the acoustic window layer 13 with relatively smaller changed hardness after filling (remaining below 60 ShoreA, preferably below 50 ShoreA) and a considerably lower attenuation (preferably below 1.5 or 2 dB/mm) compared to filled silicones. In order to bring the acoustic impedance of the filled silicon closer to the soft tissue's impedance, i.e. from 1.1 MRayl to 1.6 MRayl, a larger amount of the filler particles is required. This introduction of the particles introduces considerable attenuation and increases the hardness of the filled silicon layer.

An optimum acoustical coupling of the acoustic window layer to the membrane of the CMUT cell can be provided by a combination of uncured polymeric material having low attenuation and acoustic impedance above 1.4 MRayl, which is also resistant to oxidation over time (aging); and a relatively constant hardness of the first layer with an introduction of the embedded insulating particles.

An advantage of the application of the acoustic window layer comprising the first layer in accordance with the present invention becomes even more pronounced for the transducer arrays using CMUT cells operating in the collapsed mode. The collapsed mode of operation allows operating an ultrasound array in a wide range of acoustic waves frequencies, which can be tuned by varying a dc-bias voltage applied to the CMUTs electrodes. Thus, imposing higher requirements on the acoustic window layer bandwidth, compared to a conventional (non-collapsed) CMUT operation mode. The preferred bandwidth for the ultrasound array (preferably but not limited to the CMUT ultrasound array) overlaid by the acoustic window layer 13 in accordance with the principles of the present invention is above 80%, preferably above 100% or 120%. A different from the PZTs electrical to acoustic energy conversion principle used in the CMUTs makes CMUT arrays more demanding towards the acoustic window layers being in the direct contact with the CMUTs vibrating membranes, which may become even more pronounced for the collapsed mode of the CMUT operation.

To have a better control over the attenuation properties of the first layer 47 the insulating particles may have an average size smaller than one tens of an acoustic wavelength. Preferably the average size of the particles is lower than one tens of the acoustic wavelength of the shortest wave within an operation bandwidth of the ultrasound array. The bandwidth may be selected based on the ultrasound application such as high frequency (above 15 MHz) and high image resolution cardio-imaging. When the average size of the particles becomes larger than the wavelength of the propagating wave, an additional scattering in the acoustic window layer may happen. This may introduce artifacts in an ultrasound image.

Particular average sizes of the particles may be: in between 10 nanometer and 10 micrometer; in between 10 nanometer and 100 nanometer; or in between 1 micrometer and 10 micrometer. These ranges of the average particles cover main application of the ultrasound imaging systems at different frequencies. For example, for acoustic wave velocity of 1500 m/s one tens of the acoustic wavelength is: 150 micrometer for frequency of 1 MHz; 15 micrometer for frequency of 10 MHz and 5 micrometer for frequency of 30 MHz.

In an embodiment of the present invention it may be beneficial in using ceramic particles as the insulating particles. Ceramic particles, such as metal oxides ($ZrO_2$, $Al_2O_3$, $TiO_2$, $Bi_2O_3$, $BaSO_4$, etc.) show high insulating properties, which may be advantages in providing additional insulation to the arrays electronics. Moreover, there multiple ways developed in the art for manufacturing ceramic particles of a well-defined size.

Figure 7:
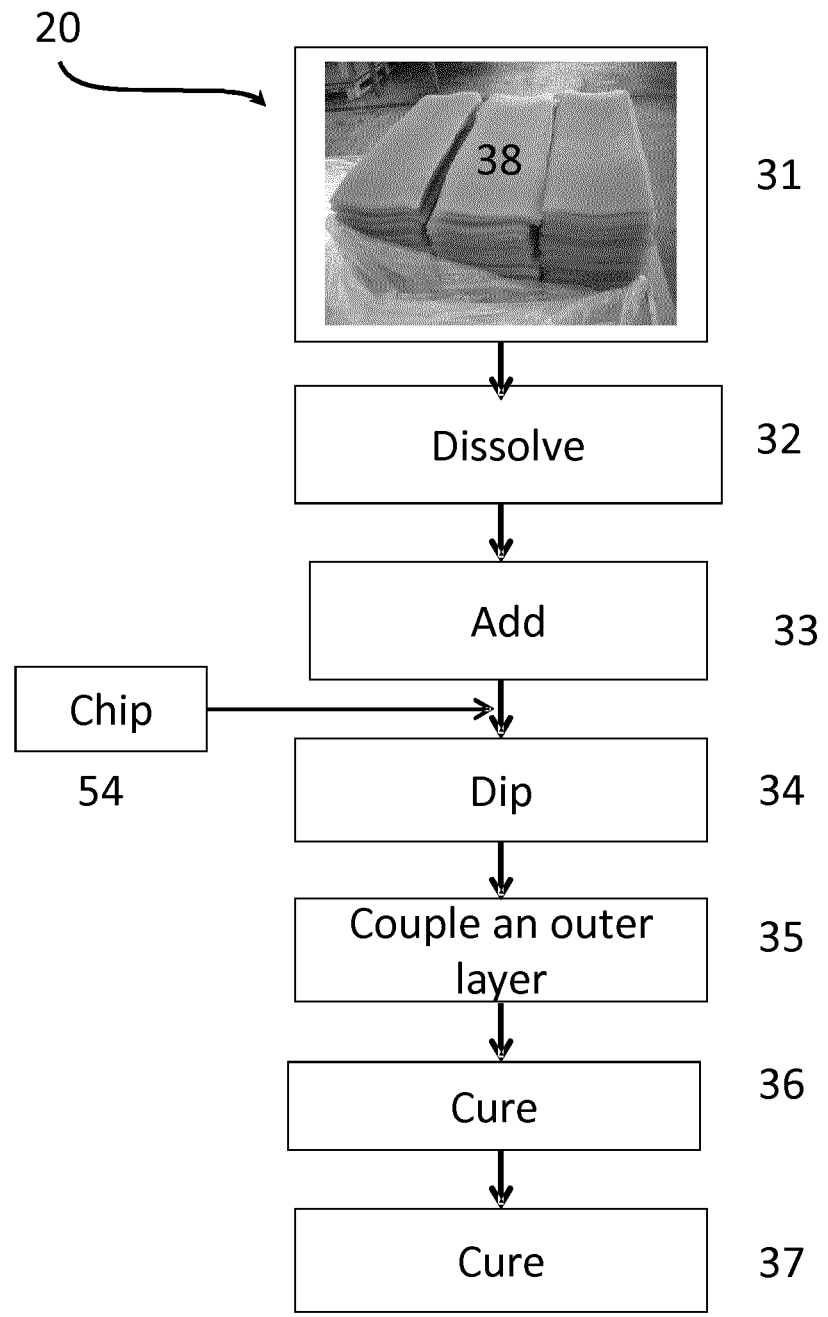
FIG. 7 schematically illustrates a method for manufacturing an ultrasound array in accordance with the present invention.

A developed industrial application of the polymeric materials is described further. In FIG. 7 a novel method 20 for manufacturing an ultrasound array in accordance with the present invention is illustrated. A granulate of pre-polymerized polybutadiene 38 (CB728 T from Lanxess) is provided in step 31. In step 32 the block is granulated and dissolved in solvents like alkanes, branched or cyclic alkanes, for example hexane, heptane, cyclohexane. In step 33 antioxidants such as sterically hindered phenol (Iraganox 1076 in this example) is added, further the optimization of the acoustic impedance of the first layer can be achieved by adding insulating particles to the solvent, wherein the polymeric material act as a dispersion agent for the particles, such that a liquid mixture of the polymeric material and the insulating particles is provided. The additional dispersion agents like fatty acids (a carboxylic acid with an aliphatic chain, which is either saturated or unsaturated) may be added in the liquid mixture. The filler particles in the liquid mixture may increase the hardness of the first layer of the acoustic window, while fatty acids may counter play this hardness increase keeping the average hardness of the first layer at the relatively constant value. The unsaturated chains of fatty acid like oleic acid, linoleic acid and linolenic acid (one, two and respectively tree double carbon bonds) can polymerise and bond to the polybutadiene chains. This provides a good dispersion/distribution of particles in the liquid mixture. In step 54 a chip having the ultrasound array with at least one CMUT cell coupled to an integrated circuitry is provided. In step 34 the chip is dipped in the liquid mixture, such that a layer comprising the liquid mixture overlays the CMUT cell. As an alternative in the step 34, the liquid mixture can be dispensed over the chip using the known to the skilled person dispersion techniques. Since in step 33 a minimum impedance mismatch between the liquid mixture and the propagating medium can be achieved, the tolerance to the thickness variation of the liquid mixture layer is rather high. The increase in the dipping time would increase the thickness of the liquid mixture layer. In the step 35 the chip with the liquid mixture layer may be let drying at elevated temperature of about 70° C. With the time, when the solvent starts evaporating from the liquid mixture, the liquid mixture layer may become more solid (sticky). At this stage the second layer of another material can be applied to the liquid mixture layer. The advantage of this step is that the second layer can be attached to the first layer without any glue. In step 36 the layer overlaying the CMUT cell is cured at a temperature sufficient to evaporate the remaining solvent (about 100° C., in the case of heptane) from the liquid mixture layer, such that an acoustic window layer 13 comprising a polymeric material 47 with insulating particles 41 embedded therein is provided overlaying the CMUT cell. Alternately, to assure a better fixation the second layer may be coupled to the first layer with the third layer of glue and further cured in step 37.

This method can be advantageously applied on industrial scale owing to the simplicity of the steps and large tolerance of the ultrasound array's performance to the acoustic layer window thickness. The layer thickness can be increased by repeating the steps of dipping 34 and drying 35. Due to the possibility of the impedance optimization in step 33 and low attenuation properties of the selected polymeric materials in accordance to the principles of the present invention, a local thickness deviation in the acoustic window layer from the average value can be higher than the accepted standard in commonly used spray or spin coat manufacturing. In addition to this manufacturing method provides flexibility in different chip designs and electrical contact bonding implemented in the array.

Figure 8:
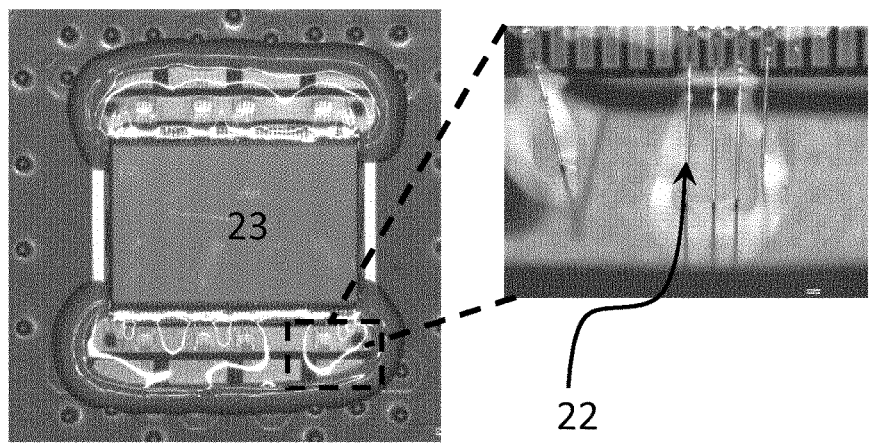
FIG. 8 shows a photo of a chip comprising an ultrasound array together with bonding wires before (a) and after (b) the acoustic window layer deposition.
Figure 8:
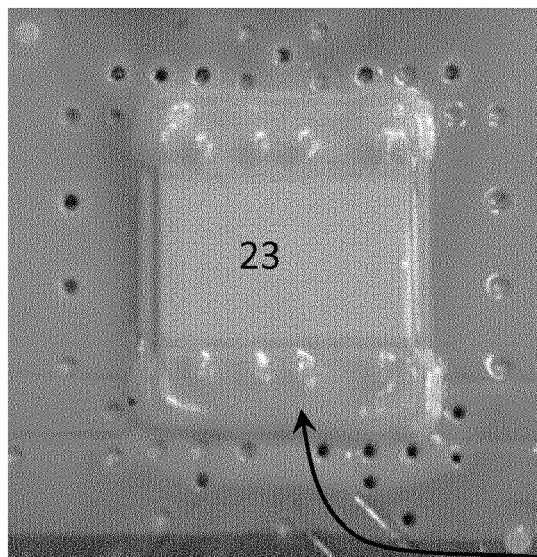

For example, FIG. 8 shows a photo of a chip comprising an ultrasound array 23 together with bonding wires 22 before (a) and after (b) the acoustic window layer deposition using the method of the present invention. Commonly used spray or spin-coat manufacturing methods of the acoustic lenses (or window layers) are highly layer thickness sensitive and may fail in providing a homogeneous coverage of the array around the free standing bonding wires 22 (FIG. 8a shows a close up of the bonding wires 22). As can be seen in FIG. 8(b) the presented method overcomes this problem providing a fully overlaid CMUT transducer array with stable acoustic window having an improved wide bandwidth performance.

The method can be also beneficially used for different chip size, especially in the area miniaturized ultrasound arrays, such as interventional devices and catheters.

Figure 9:
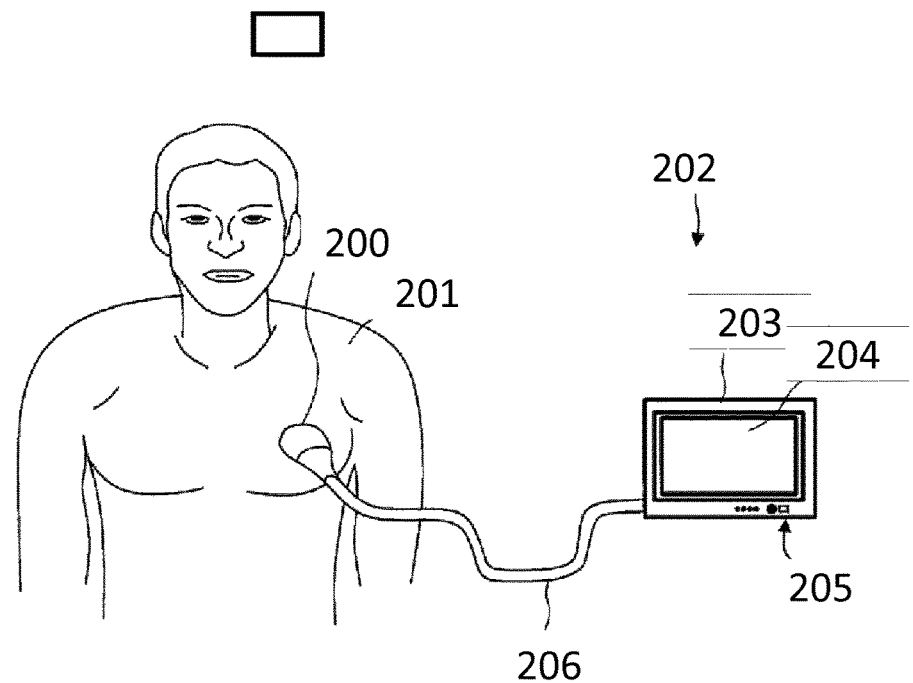
FIG. 9 shows a schematic illustration of an embodiment of an ultrasound imaging system.

FIG. 9 illustrates the principle design of an ultrasonic imaging system 202.

The ultrasound imaging system is generally denoted with reference numeral 202. The ultrasound imaging system 202 is used for scanning an area or volume of the body, e.g. of a patient 201. It is to be understood that the ultrasound system 202 may also be used for scanning other areas or volumes, e.g. body parts of animals or other living beings.

For scanning the patient 201, an ultrasound probe 200 may be provided. In the embodiment shown, the ultrasound probe 200 is connected to a console device 203. The console device 203 is shown in FIG. 9 as a mobile console. This console 203 may, however, also be realized as a stationary device. The console device 203 is connected to the probe 200 via an interface 206 formed in a wired manner. Further, it is contemplated that the console device 203 may also be connected to the probe 200 in a wireless manner, for example using UWB transmission technology. The console device 203 may further comprise an input device 205. The input device may have buttons, a key pad and/or a touchscreen to provide an input mechanism to a user of the ultrasound imaging system 202. Additionally or alternatively, other mechanisms may be present in the input device 205 to enable a user to control the ultrasound imaging system 202.

Further, the console device 203 comprises a display 204 to display display data generated by the ultrasound imaging system 202 to the user. By this, the volume within the patient 201 that is scanned via the ultrasound probe 200 can be viewed on the console device 203 by the user of the ultrasound system 200.

The ultrasound probe 200 comprises the CMUT transducer array constructed in accordance with the present invention.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. An ultrasound array for acoustic wave transmission comprising
   at least one capacitive micro-machined ultrasound transducer (CMUT) cell, wherein the at least one CMUT cell comprises:
   a substrate;
   a first electrode;
   a cell membrane having a second electrode, wherein the cell membrane opposes the first electrode and the substrate with a cavity between the cell membrane and the substrate, wherein the cell membrane is arranged to vibrate upon a cell activation; and
   an acoustic window disposed directly over the cell membrane without a coupling medium between the acoustic window and the cell membrane, wherein the acoustic window comprises:
   an inner surface opposing the cell membrane;
   an outer surface configured to contact a body of a patient;
   a first layer comprising the inner surface and molecules of antioxidant mixed with a polymeric material, said polymeric material comprising a thermoset elastomer comprising polybutadiene, wherein the polybutadiene is in an uncured state or under-cured state, wherein the first layer is in direct contact with the cell membrane.

2. The ultrasound array of claim 1,
   wherein the acoustic window comprises a second layer comprising the outer surface and a material different from the first layer,
   wherein the second layer has a larger hardness than the first layer.

3. The ultrasound array of claim 2,
   wherein the first layer has an acoustic impedance between about 1.4 megarayl and about 1.6 megarayl,
   wherein a difference in the acoustic impedance between the first layer and second layer is smaller than about 0.3 megarayl.

4. The ultrasound array of claim 2, wherein the acoustic window comprises an additional layer disposed between the first layer and the second layer, wherein the additional layer comprises polyurethane configured to glue the first layer and the second layer together.

5. The ultrasound array of claim 2, wherein the material different from the first layer comprises a thermoplastic polymer comprising polymethylpentene.

6. The ultrasound array of claim 2, wherein the material different from the first layer comprises a thermoplastic polymer comprising polyethylene.

7. The ultrasound array of claim 1, wherein the at least one CMUT cell is configured for collapsed mode operation such that the first layer is in direct contact with a first side of the cell membrane and an opposite, second side of the cell membrane is in direct contact with the substrate.

8. A catheter comprising the ultrasound array according to claim 1.

9. The ultrasound array according to claim 1, wherein the ultrasound array has a fractional bandwidth above 80% or above 100%.

10. The ultrasound array according to claim 1, wherein the thermoset elastomer has particles embedded therein.

11. The ultrasound array according to claim 10, wherein the first layer comprises 4 to 24 percent, or 15 or 20 percent, by weight of the particles based on a total weight of the first layer.

12. The ultrasound array according to claim 10, wherein the particles have an average size smaller than one tenth of an acoustic wavelength transmitted by the ultrasound array.

13. The ultrasound array according to claim 10, wherein the particles have an average size in between 10 nanometer and 10 micrometer, in between 10 nanometer and 100 nanometer, or in between 1 micrometer and 10 micrometer.

14. The ultrasound array according to claim 1, wherein the molecules of antioxidant are molecules of phenolic stabilizer.

15. The ultrasound array according to claim 14, wherein each of the molecules of phenolic stabilizer has a hydrocarbon chain coupled to a hindered phenol group.

16. The ultrasound array according to claim 14, wherein a weight ratio of the molecules of antioxidant in the first layer is at most 0.3% or 0.1%.

17. An interventional device comprising the ultrasound array according to claim 1.

* * * * *